United States Patent
Kondo et al.

(10) Patent No.: US 11,597,397 B2
(45) Date of Patent: Mar. 7, 2023

(54) ABNORMALITY DETERMINATION APPARATUS, VEHICLE ASSISTANCE SYSTEM, AND SERVER

(71) Applicant: HITACHI, LTD., Tokyo (JP)

(72) Inventors: Akihiro Kondo, Tokyo (JP); Takashi Matsumoto, Tokyo (JP)

(73) Assignee: HITACHI, LTD., Tokyo (JP)

( * ) Notice: Subject to any disclaimer, the term of this patent is extended or adjusted under 35 U.S.C. 154(b) by 296 days.

(21) Appl. No.: 17/029,686

(22) Filed: Sep. 23, 2020

(65) Prior Publication Data

US 2021/0129854 A1    May 6, 2021

(30) Foreign Application Priority Data

Oct. 30, 2019    (JP) .............................. JP2019-198018

(51) Int. Cl.
| | |
|---|---|
| *B60W 50/02* | (2012.01) |
| *H04W 4/44* | (2018.01) |
| *G08G 1/0967* | (2006.01) |

(52) U.S. Cl.
CPC ................... *B60W 50/0205* (2013.01); *G08G 1/096775* (2013.01); *H04W 4/44* (2018.02); *B60W 2050/021* (2013.01); *B60W 2050/0215* (2013.01); *B60W 2556/35* (2020.02); *B60W 2556/45* (2020.02)

(58) Field of Classification Search
CPC ......... B60W 50/0205; B60W 2556/45; B60W 2556/35; B60W 2050/021; B60W 2050/0215; H04W 4/44; G08G 1/096775
See application file for complete search history.

(56) References Cited

U.S. PATENT DOCUMENTS

| | | | |
|---|---|---|---|
| 10,101,745 B1 * | 10/2018 | Sun ..................... | G08G 1/163 |
| 10,249,109 B1 | 4/2019 | Konrardy et al. | |
| 2017/0090036 A1 * | 3/2017 | Zalewski .............. | G01S 19/215 |

(Continued)

FOREIGN PATENT DOCUMENTS

| | | |
|---|---|---|
| CN | 107063328 A | 8/2017 |
| JP | 2006-236094 A | 9/2006 |
| JP | 2010-126130 A | 6/2010 |

OTHER PUBLICATIONS

Extended European Search Report dated Mar. 30, 2021 for European Patent Application No. 20198085.1.

(Continued)

*Primary Examiner* — Peter D Nolan
*Assistant Examiner* — Wae L Louie
(74) *Attorney, Agent, or Firm* — Volpe Koenig

(57) ABSTRACT

The vehicle assistance system includes an infrastructure sensor installed in a predetermined place to detect an obstacle, an onboard apparatus connected to an onboard sensor which is mounted on the vehicle and which detects an obstacle, and a server installed in a place different from that of the infrastructure sensor. In the infrastructure sensor, the abnormality determination unit compares the first obstacle information related to the obstacle detected by the sensor unit and the second obstacle information related to the obstacle detected by the onboard sensor existing in a location different from that of the sensor unit, and determines whether or not the sensor unit or the onboard sensor is abnormal based on the result of this comparison.

5 Claims, 7 Drawing Sheets

(56) References Cited

U.S. PATENT DOCUMENTS

| | | |
|---|---|---|
| 2017/0166219 A1* | 6/2017 | Jammoussi ........ G08G 1/09675 |
| 2017/0245140 A1* | 8/2017 | Au ........................ H04W 76/27 |
| 2017/0352265 A1 | 12/2017 | Kumabe |
| 2018/0107532 A1* | 4/2018 | Park ...................... H04W 4/024 |
| 2018/0182242 A1* | 6/2018 | Vijaya Kumar ... G08G 1/09623 |
| 2018/0350233 A1 | 12/2018 | Moreno-Lahore |
| 2019/0101410 A1 | 4/2019 | Kuper et al. |
| 2019/0132709 A1* | 5/2019 | Graefe ............. G08G 1/096716 |
| 2019/0236862 A1* | 8/2019 | Mercep .................. G06V 20/58 |
| 2019/0312896 A1* | 10/2019 | Petit ................... H04L 63/1416 |
| 2019/0371085 A1* | 12/2019 | Kishikawa ............... G07C 5/08 |
| 2019/0394279 A1* | 12/2019 | Dao ...................... H04W 40/02 |
| 2020/0028736 A1* | 1/2020 | Park ...................... H04L 43/045 |
| 2020/0137580 A1* | 4/2020 | Yang ...................... H04W 12/06 |
| 2021/0027624 A1* | 1/2021 | Oberdanner ............ H04W 4/38 |
| 2021/0061306 A1* | 3/2021 | Dagan .................... H04W 4/40 |
| 2021/0129854 A1* | 5/2021 | Kondo .................. G07C 5/008 |
| 2021/0281986 A1* | 9/2021 | Zhu ..................... H04L 63/1425 |
| 2022/0274606 A1* | 9/2022 | Matsuo .................. G01S 13/86 |

OTHER PUBLICATIONS

Chinese Office Action dated May 7, 2022 for Chinese Patent Application No. 202010893890.9.

\* cited by examiner

ABNORMALITY DETERMINATION APPARATUS, VEHICLE ASSISTANCE SYSTEM, AND SERVER

BACKGROUND OF THE INVENTION

1. Field of the Invention

The present invention relates to an abnormality determination apparatus, a vehicle assistance system, and a server.

2. Description of the Related Art

Conventionally, a technique has been proposed which acquires information not only from a sensor mounted on a vehicle but also from a sensor installed outside the vehicle to provide the vehicle with safety assistance such as avoidance of collision with an obstacle. For example, JP 2006-236094 A discloses an obstacle recognition system which includes a roadside camera installed on the roadside to capture an image of the road and an onboard camera mounted on the vehicle to capture an image of the road, and which detects and recognizes obstacles by integrating the respective images captured by these cameras and performing recognition processing.

SUMMARY OF THE INVENTION

In the system of JP 2006-236094 A, in order to correctly recognize the obstacle, it is premised that both the roadside camera and the onboard camera being image sensors operate normally, and if any one of the cameras (sensors) is abnormal, the obstacle cannot be correctly recognized. Therefore, it is preferable to determine the presence/absence of a sensor abnormality during system operation so that appropriate measures can be taken at an early stage when a sensor abnormality occurs, but this has not been taken into consideration in the past.

An abnormality determination apparatus according to the first aspect of the present invention includes an abnormality determination unit configured to compare first obstacle information related to an obstacle detected by a first sensor with second obstacle information related to the obstacle detected by a second sensor existing in a location different from a location of the first sensor, the abnormality determination unit configured to determine whether or not the first sensor or the second sensor is abnormal based on a result of the comparison.

A vehicle assistance system according to the second aspect of the present invention includes: an infrastructure sensor installed in a predetermined place, the infrastructure sensor configured to detect an obstacle; an onboard apparatus connected to an onboard sensor mounted on a vehicle, the onboard sensor configured to detect the obstacle; and a server installed in a place different from a place of the infrastructure sensor. The infrastructure sensor includes: a sensor unit configured to detect the obstacle; an infrastructure-side obstacle notification unit configured to notify the onboard apparatus of a detection result of the obstacle by the sensor unit; an abnormality determination unit configured to compare a detection result of the obstacle by the sensor unit with a detection result of the obstacle by the onboard sensor notified from the onboard apparatus, the abnormality determination unit configured to determine whether or not the sensor unit or the onboard sensor is abnormal based on a result of the comparison; and a warning notification unit configured to notify the server of a warning based on a determination result by the abnormality determination unit. The onboard apparatus includes: a vehicle-side obstacle notification unit configured to notify the infrastructure sensor of a detection result of the obstacle by the onboard sensor; a sensor fusion unit configured to recognize the obstacle based on a detection result of the obstacle by the sensor unit notified from the infrastructure sensor and a detection result of the obstacle by the onboard sensor; and a vehicle location notification unit configured to notify the server of a location of the vehicle. The server includes: an infrastructure cooperative vehicle selection unit configured to select at least one or more infrastructure cooperative vehicles from among a plurality of the vehicles based on a location of the vehicle notified from the onboard apparatus and a predetermined travel plan of the vehicle; and an infrastructure cooperative vehicle notification unit configured to notify the infrastructure sensor of the infrastructure cooperative vehicle selected by the infrastructure cooperative vehicle selection unit. The abnormality determination unit compares a detection result of the obstacle by the sensor unit with a detection result of the obstacle by the onboard sensor mounted on the infrastructure cooperative vehicle notified by the infrastructure cooperative vehicle notification unit.

A vehicle assistance system according to the third aspect of the present invention includes: an infrastructure sensor installed in a predetermined place, the infrastructure sensor configured to detect an obstacle; an onboard apparatus connected to an onboard sensor mounted on a vehicle, the onboard sensor configured to detect an obstacle; and a server installed in a place different from a place of the infrastructure sensor. The infrastructure sensor includes: a sensor unit configured to detect the obstacle; an infrastructure-side obstacle notification unit configured to notify the onboard apparatus and the server of a detection result of the obstacle by the sensor unit; and a relay unit configured to notify the server of a detection result of the obstacle by the onboard sensor notified from the onboard apparatus. The onboard apparatus includes: a vehicle-side obstacle notification unit configured to notify the infrastructure sensor of a detection result of the obstacle by the onboard sensor; a sensor fusion unit configured to recognize the obstacle based on a detection result of the obstacle by the sensor unit notified from the infrastructure sensor and a detection result of the obstacle by the onboard sensor; and a vehicle location notification unit configured to notify the server of a location of the vehicle. The server includes: an infrastructure cooperative vehicle selection unit configured to select at least one or more infrastructure cooperative vehicles from among a plurality of the vehicles based on a location of the vehicle notified from the onboard apparatus and a predetermined travel plan of the vehicle; and an abnormality determination unit configured to compare a detection result of the obstacle by the sensor unit notified from the infrastructure sensor with a detection result of the obstacle by the onboard sensor mounted on the infrastructure cooperative vehicle among a plurality of the vehicles, the abnormality determination unit configured to determine whether or not the sensor unit or the onboard sensor is abnormal based on a result of the comparison.

When any one of an infrastructure sensor which is installed in a predetermined place and which detects an obstacle, and an onboard sensor which is installed in a vehicle and which detects the obstacle is abnormal, a server according to the fourth aspect of the present invention displays a predetermined warning including at least location information on a sensor where the abnormality has occurred.

According to the present invention, it is possible to determine the presence or absence of a sensor abnormality during operation of the system.

DESCRIPTION OF THE PREFERRED EMBODIMENTS

First Embodiment

Figure 1:
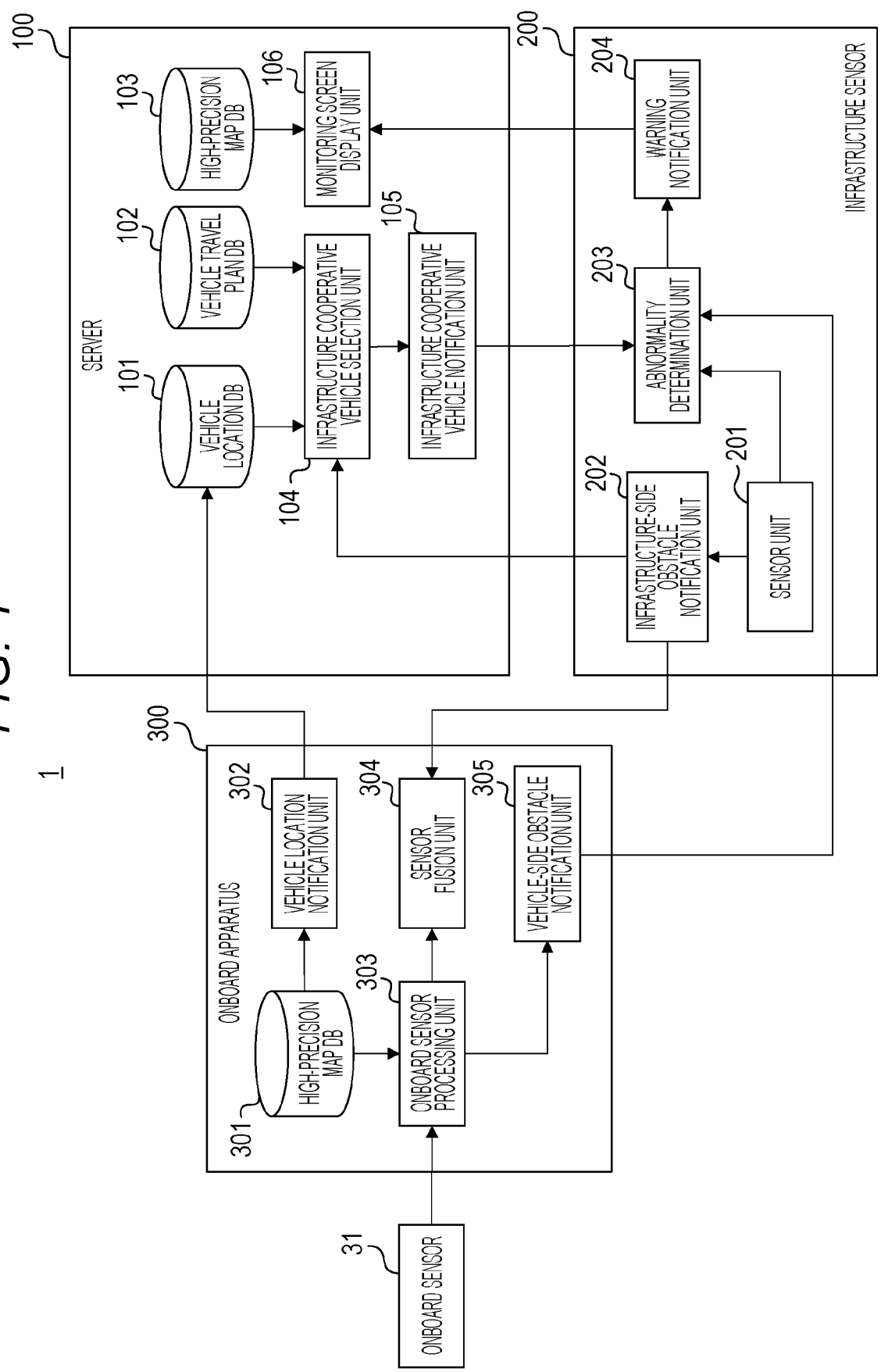
FIG. 1 is a diagram showing a configuration of a vehicle assistance system according to a first embodiment of the present invention.

FIG. 1 is a diagram showing a configuration of a vehicle assistance system according to a first embodiment of the present invention. The vehicle assistance system 1 shown in FIG. 1 includes a server 100, an infrastructure sensor 200, and an onboard apparatus 300, and performs assistance on the vehicle on which the onboard apparatus 300 is mounted when the vehicle travels in a self driving or a manual driving. It should be noted that, hereinafter, the vehicle on which the onboard apparatus 300 is mounted is simply referred to as "vehicle".

The server 100 is an information apparatus that manages and assists vehicles, and is installed in a predetermined facility such as an information center. The server 100 includes respective functional blocks of a vehicle location DB 101, a vehicle travel plan DB 102, a high-precision map DB 103, an infrastructure cooperative vehicle selection unit 104, an infrastructure cooperative vehicle notification unit 105, and a monitoring screen display unit 106. The server 100 has a hardware configuration including a CPU, a memory, and a storage (HDD, SSD, and the like) (not shown), and executes a predetermined program using these pieces of hardware, thereby capable of achieving each of the above functional blocks.

The infrastructure sensor 200 is installed in a predetermined place near the road on which the vehicle travels, and detects an obstacle existing around the road in a place different from the vehicle. It should be noted that although only one infrastructure sensor 200 is shown in FIG. 1, a plurality of infrastructure sensors 200 may be installed near the road. The infrastructure sensor 200 includes respective functional blocks of a sensor unit 201, an infrastructure-side obstacle notification unit 202, an abnormality determination unit 203, and a warning notification unit 204.

The onboard apparatus 300 is mounted on a vehicle, performs control necessary for autonomously moving a vehicle capable of self driving along a predetermined traveling route, and performs driving assistance and the like on a driver of a vehicle traveling by manual driving. The onboard apparatus 300 is connected to the onboard sensor 31 mounted on the vehicle. The onboard sensor 31 is a sensor that can detect various obstacles existing around the vehicle, and is configured using, for example, a camera, a radar, a Light Detection and Ranging (LiDAR), or the like. It should be noted that only one onboard apparatus 300 is shown in FIG. 1, but a plurality of vehicles may mount respective onboard apparatuses 300, and each onboard apparatus 300 may constitute the vehicle assistance system 1 together with the server 100 and the infrastructure sensor 200. The onboard apparatus 300 includes respective functional blocks of a high-precision map DB 301, a vehicle location notification unit 302, an onboard sensor processing unit 303, a sensor fusion unit 304, and a vehicle-side obstacle notification unit 305.

Next, the functional blocks included in each of the server 100, the infrastructure sensor 200, and the onboard apparatus 300 will be described below.

In the server 100, the vehicle location DB 101 is a database in which the location of each vehicle is recorded. When the vehicle location notification unit 302 of the onboard apparatus 300 transmits the location information of the vehicle on which the onboard apparatus 300 is mounted, the server 100 receives the location information and records the location information in the vehicle location DB 101 in combination with the vehicle ID for specifying the vehicle. Thus, the current location of each vehicle is registered in the vehicle location DB 101. It should be noted that the server 100 can communicate with the onboard apparatus 300 using, for example, a mobile communication network (4G, 5G).

The vehicle travel plan DB 102 is a database in which a travel plan of each vehicle, that is, information related to a road on which each vehicle is scheduled to travel in the future, is recorded. It should be noted that the travel plan of each vehicle stored in the vehicle travel plan DB 102 may be formulated on any one of the vehicle side and the server 100 side. When the travel plan is formulated on the vehicle side, the server 100 can receive the travel plan formulated on the vehicle side from the onboard apparatus 300 and record the travel plan in the vehicle travel plan DB 102. In any of the cases, it is preferable that the server 100 manages the travel plan of each vehicle by storing and holding in the vehicle travel plan DB 102 the travel plan of each vehicle in combination with the vehicle ID unique to each vehicle.

The high-precision map DB 103 is a database in which map information on areas where each vehicle can travel is recorded. The high-precision map DB 103 is configured to include, for example, road map information on all areas of the country and map information on parking lots. It should be noted that when the vehicle can move autonomously, it is preferable to use, as the high-precision map DB 103, one having higher precision than general map information used in the conventional navigation apparatus or the like.

When the infrastructure sensor 200 detects an obstacle, the infrastructure cooperative vehicle selection unit 104 selects, as the infrastructure cooperative vehicle, a vehicle that can detect the obstacle using the onboard sensor 31 separately from the infrastructure sensor 200. That is, the infrastructure cooperative vehicle is a vehicle mounted with the onboard sensor 31 that can detect the same obstacle in cooperation with the infrastructure sensor 200. The vehicle assistance system 1 of the present embodiment compares the respective detection results of the obstacles acquired by the infrastructure sensor 200 and by the onboard sensor 31 of the infrastructure cooperative vehicle, thereby determining whether the infrastructure sensor 200 or the onboard sensor 31 is abnormal. The infrastructure cooperative vehicle selection unit 104 selects the infrastructure cooperative vehicle used for the abnormality determination based on the location of each vehicle recorded in the vehicle location DB 101, the travel plan of each vehicle recorded in the vehicle travel plan DB 102, and the obstacle information sent from the infrastructure sensor 200.

The infrastructure cooperative vehicle notification unit 105 notifies the infrastructure sensor 200 of the infrastructure cooperative vehicle selected by the infrastructure cooperative vehicle selection unit 104. The infrastructure cooperative vehicle notification unit 105 transmits information related to the infrastructure cooperative vehicle such as a vehicle ID unique to the infrastructure cooperative vehicle to the infrastructure sensor 200 using, for example, a mobile communication network (4G, 5G) or a fixed line, thereby notifying the infrastructure sensor 200 of the infrastructure cooperative vehicle.

The monitoring screen display unit 106 displays a monitoring screen for monitoring the state of the vehicle assistance system 1 to the administrator of the vehicle assistance system 1. The monitoring screen display unit 106 includes, for example, a liquid crystal display, and displays a monitoring screen indicating that an abnormality has occurred in the infrastructure sensor 200 or the onboard sensor 31 in response to a warning notification from the infrastructure sensor 200. On this monitoring screen, the location or the like of the sensor in which the abnormality has occurred is displayed on the map displayed based on the high-precision map DB 103, for example.

In the infrastructure sensor 200, the sensor unit 201 is configured using various sensors such as a camera, radar, and LiDAR. The sensor unit 201 has a predetermined sensing range corresponding to these sensors, based on the location where the infrastructure sensor 200 is installed. When the obstacle is detected within the sensing range, the sensor unit 201 generates obstacle information related to the obstacle and outputs the obstacle information to the infrastructure-side obstacle notification unit 202 and the abnormality determination unit 203. It should be noted that, hereinafter, the obstacle information generated by the sensor unit 201, that is, the obstacle information related to the obstacle detected by the infrastructure sensor 200 is referred to as "first obstacle information".

The first obstacle information includes, for example, information indicating the type and location of the obstacle detected by the sensor unit 201. The location of the obstacle in the first obstacle information may be expressed by a relative location with the installation location of the infrastructure sensor 200 as a reference, or may be expressed by an absolute location such as latitude/longitude. It should be noted that when the location of the obstacle is represented by the relative location, in order that the absolute location of the obstacle can be calculated in the server 100 or the onboard apparatus 300, the first obstacle information may include the location information on the infrastructure sensor 200, or the installation location of the infrastructure sensor 200 may be registered in advance in the server 100 or the onboard apparatus 300. On the other hand, when the location of the obstacle is expressed by an absolute location, for example, the sensor unit 201 can determine the absolute location of the obstacle based on the location information on the infrastructure sensor 200 preset in the infrastructure sensor 200 and the distance and angle, detected by the sensor unit 201, from the infrastructure sensor 200 to the obstacle.

The infrastructure-side obstacle notification unit 202 has a communication function with the server 100 and the onboard apparatus 300, and transmits the first obstacle information generated by the sensor unit 201 to the server 100 and the onboard apparatus 300, thereby notifying the server 100 and the onboard apparatus 300 of the detection result of the obstacle by the infrastructure sensor 200. The infrastructure-side obstacle notification unit 202 can perform communication with the server 100 and the onboard apparatus 300 using, for example, a fixed line, a mobile communication network (4G, 5G), a wireless LAN, or the like.

The abnormality determination unit 203 performs an abnormality determination that determines whether or not an abnormality has occurred in the sensor unit 201 or the onboard sensor 31. In this abnormality determination, the first obstacle information generated by the sensor unit 201 is compared with the obstacle information on the onboard sensor 31 transmitted from the onboard apparatus 300 to the infrastructure sensor 200 (hereinafter, referred to as "second obstacle information") to compare between the detection results of the same obstacle by these sensors, and it is determined which sensor has an abnormality based on the comparison result. It should be noted that the specific procedure of the abnormality determination by the abnormality determination unit 203 will be described below. If it is determined that an abnormality occurs in the sensor unit 201 or the onboard sensor 31, the abnormality determination unit 203 generates a warning according to the determination result and outputs the warning to the warning notification unit 204.

When the abnormality determination unit 203 generates a warning, the warning notification unit 204 transmits the warning information to the server 100, thereby notifying the warning. The warning notification unit 204 can communicate with the server 100 using, for example, a fixed line or a mobile communication network (4G, 5G).

In the onboard apparatus 300, the high-precision map DB 301 is a database in which map information similar to the high-precision map DB 103 of the server 100 is recorded. For example, the onboard apparatus 300 can formulate a travel plan of the vehicle, control autonomous movement of the vehicle, display a map screen, and the like using the high-precision map DB 301.

The vehicle location notification unit 302 determines the location of the vehicle to notify the server 100 based on the GPS signal received by a GPS sensor (not shown) and information related to the motion state of the vehicle (speed, acceleration, steering amount, and the like) detected by a speed sensor, an acceleration sensor, a gyro sensor, and the like (not shown). At this time, performing well-known map matching processing using the high-precision map DB 301 may correct so that the location of the vehicle is on the road. The vehicle location notification unit 302 transmits the vehicle location information in combination with the vehicle ID unique to the vehicle to the server 100 using, for example, the mobile communication network (4G, 5G), thereby notifying the vehicle location.

It should be noted that the location of the vehicle notified from the onboard apparatus 300 by the vehicle location notification unit 302 is received by the server 100 and recorded in the vehicle location DB 101 as described above. Thus, the current location of each vehicle is managed in the server 100.

The onboard sensor processing unit 303 generates second obstacle information related to the obstacle detected by the onboard sensor 31 based on the signal output from the onboard sensor 31 to output the second obstacle information to the sensor fusion unit 304 and the vehicle-side obstacle notification unit 305. The second obstacle information generated by the onboard sensor processing unit 303 also includes, for example, information indicating the type and location of the obstacle detected by the onboard sensor 31 similarly to the first obstacle information generated by the sensor unit 201 in the infrastructure sensor 200. When generating the second obstacle information, the onboard sensor processing unit 303 may correct the location of the obstacle or estimate the type of the obstacle by referring to the high-precision map DB 301.

Based on the first obstacle information transmitted from the infrastructure sensor 200 by the infrastructure-side obstacle notification unit 202 and the second obstacle information generated by the onboard sensor processing unit 303, the sensor fusion unit 304 generates integrated obstacle information obtained by integrating the detection results of the obstacle by the infrastructure sensor 200 and the onboard sensor 31, and recognizes the obstacle. The integrated obstacle information generated by the sensor fusion unit 304 is used for autonomous movement control of a vehicle capable of self driving, or displayed on a display unit (not shown) to be presented to the driver of the vehicle. Thus, an obstacle existing in a location that cannot be detected by the onboard sensor 31, for example, an obstacle existing in the shadow of a building when viewed from the vehicle and an obstacle existing outside the sensing range of the onboard sensor 31 as well can be recognized on the vehicle side, and it is possible to improve safety at the time of vehicle travel.

The vehicle-side obstacle notification unit 305 has a communication function with the infrastructure sensor 200, and transmits the second obstacle information generated by the onboard sensor processing unit 303 to the infrastructure sensor 200, thereby notifying the detection result of the obstacle by the onboard sensor 31. The vehicle-side obstacle notification unit 305 can communicate with the infrastructure sensor 200 using, for example, a mobile communication network (4G, 5G) or a wireless LAN.

It should be noted that the second obstacle information transmitted from the onboard apparatus 300 by the vehicle-side obstacle notification unit 305 is received in the infrastructure sensor 200 and used in the above-described abnormality determination performed by the abnormality determination unit 203.

Next, the sensor abnormality determination performed by the vehicle assistance system 1 according to the present embodiment will be described with reference to FIGS. 2 and 3.

Operating the vehicle assistance system 1 according to the present embodiment allows the detection results of the obstacle detected by the infrastructure sensor 200 and the onboard sensor 31 to be integrated in the onboard apparatus 300 as described above, and allows integrated obstacle information to be generated. Furthermore, the vehicle assistance system 1 performs sensor abnormality determination for determining whether the infrastructure sensor 200 or the onboard sensor 31 is abnormal during operation of the system according to the processing flows in FIGS. 2 and 3.

Figure 2:
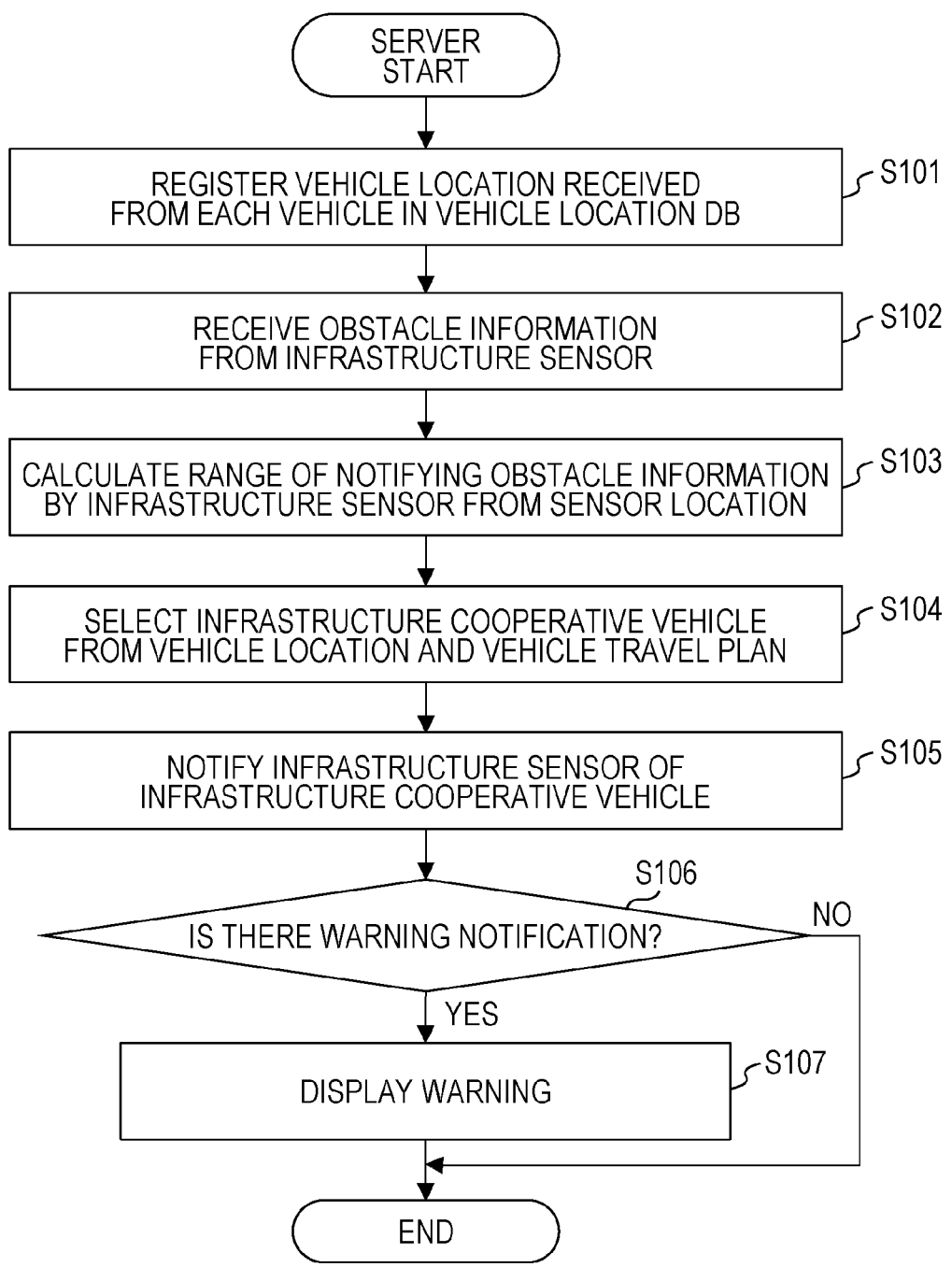
FIG. 2 is a diagram showing a processing flow of a sensor abnormality determination executed by a server in the vehicle assistance system according to the first embodiment of the present invention.

FIG. 2 is a diagram showing a processing flow of sensor abnormality determination executed by the server 100 in the vehicle assistance system 1 according to the first embodiment of the present invention.

In step S101, the server 100 registers the vehicle location received from each vehicle in the vehicle location DB 101. Each vehicle transmits its own location information to the server 100 at intervals of a predetermined time with the vehicle location notification unit 302 of the onboard apparatus 300. When receiving the location information transmitted from each vehicle, the server 100 can manage the travel history of each vehicle by recording the location of each vehicle in the vehicle location DB 101 at predetermined time intervals based on the location information. It should be noted that when it is not necessary to manage the travel history of each vehicle, only the latest location information may be recorded and held in the vehicle location DB 101, and the past location information may be deleted.

In step S102, the server 100 receives first obstacle information from the infrastructure sensor 200. The infrastructure sensor 200 causes the infrastructure-side obstacle notification unit 202 to transmit the first obstacle information related to the obstacle detected by the sensor unit 201 to the server 100. In step S102, the server 100 receives the first obstacle information.

In step S103, the server 100 causes the infrastructure cooperative vehicle selection unit 104 to calculate the range in which the first obstacle information is notified from the infrastructure sensor 200 to the vehicle based on the installation location of the infrastructure sensor 200. For example, in a circular range whose center is the installation location of the infrastructure sensor 200 and whose radius is a distance within which the sensor unit 201 can detect an obstacle, a range that overlaps with the region where the vehicle can pass is calculated as the notification range of the first obstacle information. At this time, the notification range of the first obstacle information may be adjusted in consideration of the surrounding environment of the infrastructure sensor 200.

In step S104, the server 100 causes the infrastructure cooperative vehicle selection unit 104 to select the infrastructure cooperative vehicle from the vehicles existing within the notification range of the first obstacle information calculated in step S103 based on the location of each vehicle notified from the onboard apparatus 300 and recorded in the vehicle location DB 101, and the travel plan of each vehicle predetermined and recorded in the vehicle travel plan DB 102. Specifically, based on the location and the travel plan of each vehicle, among vehicles mounted with the onboard apparatuses 300, a vehicle during travel or scheduled to travel in the future in the notification range of the first obstacle information is specified, and is selected as an infrastructure cooperative vehicle. At this time, it is preferable to select the infrastructure cooperative vehicle in consideration of the detection range of the onboard sensor 31, the surrounding environment, and the like. For example, even if a vehicle exists within the notification range of the first obstacle information, the vehicle traveling toward a direction away from the obstacle or the vehicle from which the obstacle is hidden behind a building or the like and cannot be seen is not selected as an infrastructure cooperative vehicle in step S104. Thus, at least one or more infrastructure cooperative vehicles are selected from among a plurality of vehicles mounted with the onboard apparatuses 300.

In step S105, the server 100 causes the infrastructure cooperative vehicle notification unit 105 to notify the infrastructure sensor 200 of the infrastructure cooperative vehicle selected in step S104. Here, for example, the vehicle ID or the like of each infrastructure cooperative vehicle is transmitted from the server 100 to the infrastructure sensor 200 as information related to the infrastructure cooperative vehicle, thereby notifying the infrastructure cooperative vehicle.

In step S106, the server 100 determines whether there is a warning notification from the infrastructure sensor 200. If a warning notification is received from the warning notification unit 204 of the infrastructure sensor 200, it is determined that there is a warning notification and the process proceeds to step S107, and if the warning notification is not received, it is determined that there is no warning notification and the processing shown in the flowchart in FIG. 2 ends.

In step S107, the server 100 causes the monitoring screen display unit 106 to display a warning based on the warning notification from the infrastructure sensor 200. In this warning display, based on the result of the abnormality determination performed by the abnormality determination unit 203 in the infrastructure sensor 200, when any one of the infrastructure sensor 200 and the onboard sensor 31 of the infrastructure cooperative vehicle is abnormal, the location information or the like on the sensor in which the abnormality has occurred is displayed.

After executing step S107, the server 100 ends the processing shown in the flowchart in FIG. 2.

Figure 3:
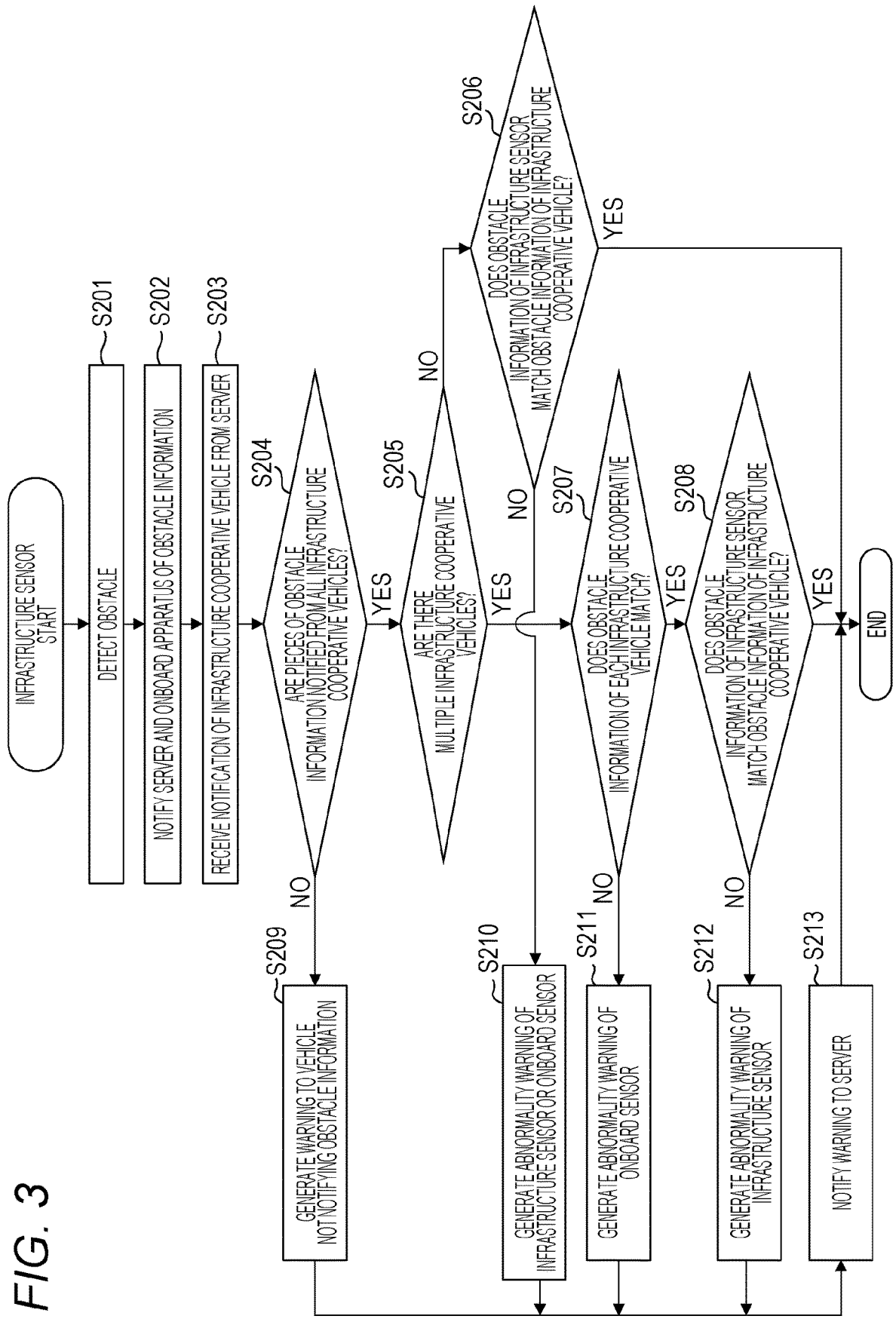
FIG. 3 is a diagram showing a processing flow of a sensor abnormality determination executed by an infrastructure sensor in the vehicle assistance system according to the first embodiment of the present invention.

FIG. 3 is a diagram showing a processing flow of sensor abnormality determination executed by the infrastructure sensor 200 in the vehicle assistance system 1 according to the first embodiment of the present invention.

In step S201, the infrastructure sensor 200 causes the sensor unit 201 to detect an obstacle to generate first obstacle information.

In step S202, the infrastructure sensor 200 causes the infrastructure-side obstacle notification unit 202 to notify the server 100 and the onboard apparatus 300 of the first obstacle information related to the obstacle detected by the sensor unit 201 in step S201. Here, transmission of the first obstacle information generated by the sensor unit 201 in step S201 from the infrastructure-side obstacle notification unit 202 to the server 100 and onboard apparatus 300, respectively, causes the obstacle detected by the infrastructure sensor 200 to be notified. The first obstacle information notified from the infrastructure sensor 200 in step S202 is received by the server 100 in step S102 in FIG. 2, and is used for the calculation of the notification range of the first obstacle information to be performed in step S103. On the other hand, in the onboard apparatus 300, the first obstacle information is used for the generation of integrated obstacle information, which is performed by the sensor fusion unit 304.

In step S203, the infrastructure sensor 200 receives the notification of the infrastructure cooperative vehicle from the server 100. Here, in response to the notification of the first obstacle information sent to the server 100 in step S202, the information transmitted from the infrastructure cooperative vehicle notification unit 105 of the server 100 is received in step S105 in FIG. 2. Then, at least one or more infrastructure cooperative vehicles are specified based on the vehicle ID of each infrastructure cooperative vehicle included in the received information. It should be noted that when there is no infrastructure cooperative vehicle, since the sensor abnormality determination cannot be performed, the infrastructure sensor 200 preferably terminates the processing shown in the flowchart in FIG. 3 without performing the processing of step S204 and subsequent steps.

In step S204, the infrastructure sensor 200 determines whether the second obstacle information has been notified from all the infrastructure cooperative vehicles based on the notification of the infrastructure cooperative vehicles received from the server 100 in step S203. After execution of step S203, if the second obstacle information is notified from all the infrastructure cooperative vehicles within a predetermined time, the process proceeds to step S205, and if the notification of the second obstacle information is not received from at least one or more infrastructure cooperative vehicles, the process proceeds to step S209. It should be noted that the infrastructure cooperative vehicle is usually located at a location different from the installation location of the infrastructure sensor 200, and the information on the obstacle detected by the onboard sensor 31 at the location is notified from the onboard apparatus 300 to the infrastructure sensor 200 as the second obstacle information.

In step S205, the infrastructure sensor 200 determines whether there are a plurality of infrastructure cooperative vehicles that have received the notification of the second obstacle information. If there are a plurality of infrastructure cooperative vehicles, the process proceeds to step S207, and if there are not a plurality of infrastructure cooperative vehicles, that is, when there is only one infrastructure cooperative vehicle, the process proceeds to step S206.

In step S206, the infrastructure sensor 200 causes the abnormality determination unit 203 to compare the first obstacle information generated by detecting the obstacle by the sensor unit 201 in step S201 and the second obstacle information notified from one infrastructure cooperative vehicle to determine whether these match each other. Specifically, for example, the abnormality determination unit 203 compares the type and location of the obstacle represented by the first obstacle information and the type and location of the obstacle represented by the second obstacle information, respectively, and if both are the same, the abnormality determination unit 203 determines that the first obstacle information and the second obstacle information match each other. On the other hand, if any one or both of the type and location of the obstacle are different, the abnormality determination unit 203 determines that the first obstacle information and the second obstacle information do not match. It should be noted that if it is possible to appropriately determine whether the first obstacle information and the second obstacle information match, the content and type of information to be compared by the abnormality determination unit 203 are not limited to this. In addition, as described above, if the location of the obstacle is represented by the relative location in the first obstacle information or the second obstacle information, for proper comparison, it is preferable to unify the expressions into one using the same reference location.

As a result of the determination in step S206, if it is determined that the first obstacle information and the second obstacle information match, it is determined that both the sensor unit 201 of the infrastructure sensor 200 and the onboard sensor 31 mounted on the infrastructure cooperative vehicle are normal, and the processing shown in the flowchart in FIG. 3 is ended. In this case, the warning notification from the infrastructure sensor 200 to the server 100 is not performed, and step S107 in FIG. 2 is not executed in the server 100. On the other hand, as a result of the determination in step S206, if it is determined that the first obstacle information and the second obstacle information do not match, it is determined that any one of the sensor unit 201 of the infrastructure sensor 200 and the onboard sensor 31 mounted on the infrastructure cooperative vehicle is abnormal, and the process proceeds to step S210.

In step S207, the infrastructure sensor 200 causes the abnormality determination unit 203 to compare the pieces of second obstacle information notified from a plurality of infrastructure cooperative vehicles, respectively, and determine whether these pieces of information match each other. Specifically, for example, the types and locations of the obstacle represented by the pieces of the second obstacle information from the respective infrastructure cooperative vehicles are compared with each other, and if these are the same for all the infrastructure cooperative vehicles, it is determined that the pieces of the second obstacle information match between the infrastructure cooperative vehicles. On the other hand, regarding at least one infrastructure cooperative vehicle, if any one or both of the type and location of the obstacle are different from other infrastructure cooperative vehicles, it is determined that the pieces of the second obstacle information do not match between the infrastructure cooperative vehicles. It should be noted that, similarly to step S206 described above, if it is possible to appropriately determine whether the pieces of the second obstacle information from the respective infrastructure cooperative vehicles match, the content and type of information to be compared by the abnormality determination unit 203 are not limited to this. In addition, as described above, if the location of the obstacle is represented by the relative location in the second obstacle information, for proper comparison, it is preferable to unify the expressions into one using the same reference location.

As a result of the determination in step S207, if it is determined that the pieces of the second obstacle information match between the infrastructure cooperative vehicles, the process proceeds to step S208. On the other hand, as a result of the determination in step S207, if it is determined that the pieces of the second obstacle information do not match between the infrastructure cooperative vehicles, it is determined that any one of the respective onboard sensors 31 mounted on a plurality of infrastructure cooperative vehicles is abnormal, and the process proceeds to step S211.

In step S208, the infrastructure sensor 200 causes the abnormality determination unit 203 to compare the first obstacle information generated by detecting the obstacle by the sensor unit 201 in step S201 and the second obstacle information notified from each infrastructure cooperative vehicle to determine whether these match each other. Here, any of the respective pieces of the second obstacle information notified from a plurality of infrastructure cooperative vehicles, namely, the pieces of the second obstacle information determined to be the same in step S207 are selected, and the determination in step S208 can be performed by the same method as in step S206 using the selected pieces of the second obstacle information.

As a result of the determination in step S208, if it is determined that the first obstacle information and the second obstacle information match, it is determined that both the sensor unit 201 of the infrastructure sensor 200 and the onboard sensor 31 mounted on each infrastructure cooperative vehicle are normal, and the processing shown in the flowchart in FIG. 3 is ended. In this case, the warning notification from the infrastructure sensor 200 to the server 100 is not performed, and step S107 in FIG. 2 is not executed in the server 100. On the other hand, as a result of the determination in step S208, if it is determined that the first obstacle information and the second obstacle information do not match, it is determined that the sensor unit 201 of the infrastructure sensor 200 is abnormal, and the process proceeds to step S212.

In step S209, the infrastructure sensor 200 causes the abnormality determination unit 203 to generate a warning according to the determination result in step S204. Here, a warning indicating that there exists a vehicle that has not notified the second obstacle information despite being selected as an infrastructure cooperative vehicle is generated and output to the warning notification unit 204. When the warning is generated in step S209, the process proceeds to step S213.

In step S210, the infrastructure sensor 200 causes the abnormality determination unit 203 to generate a warning according to the determination result in step S206. Here, a warning indicating that any one of the infrastructure sensor 200 and the onboard sensor 31 mounted on the infrastructure cooperative vehicle is abnormal is generated and output to the warning notification unit 204. When the warning is generated in step S210, the process proceeds to step S213.

In step S211, the infrastructure sensor 200 causes the abnormality determination unit 203 to generate a warning according to the determination result in step S207. Here, of the respective onboard sensors 31 mounted on a plurality of infrastructure cooperative vehicles, with the onboard sensor 31 that has notified the second obstacle information having a content different from that of the first obstacle information as a warning target, a warning indicating that the onboard sensor 31 is abnormal is generated and output to the warning notification unit 204. When the warning is generated in step S211, the process proceeds to step S213.

In step S212, the infrastructure sensor 200 causes the abnormality determination unit 203 to generate a warning according to the determination result in step S208. Here, with the infrastructure sensor 200 as a warning target, a warning indicating that the infrastructure sensor 200 is abnormal is generated and output to the warning notification unit 204. When the warning is generated in step S212, the process proceeds to step S213.

In step S213, the infrastructure sensor 200 causes the warning notification unit 204 to notify the server 100 of a warning generated in any one of steps S209 to S212. In the server 100 that has received this warning notification, executing step S107 in FIG. 2 causes a warning display targeting the sensor in which an abnormality has occurred to be performed in the monitoring screen display unit 106. Thus, when an abnormality occurs in the infrastructure sensor 200 or the onboard sensor 31 during the operation of the vehicle assistance system 1, the system administrator is notified to that effect.

After executing step S213, the infrastructure sensor 200 ends the processing shown in the flowchart in FIG. 3.

According to the first embodiment of the present invention described above, the following action and effect are produced.

(1) In the infrastructure sensor 200, the abnormality determination unit 203 compares the first obstacle information related to the obstacle detected by the sensor unit 201 and the second obstacle information related to the obstacle detected by the onboard sensor 31 existing in a location different from that of the sensor unit 201, and determines whether or not the sensor unit 201 or the onboard sensor 31 is abnormal based on the result of this comparison. Thus, it is possible to determine the presence or absence of a sensor abnormality in the sensor unit 201 or the onboard sensor 31 during operation of the vehicle assistance system 1.

(2) The sensor unit 201 is a sensor portion of the infrastructure sensor 200 installed at a predetermined place, and the onboard sensor 31 is mounted on the vehicle. Thus, in the vehicle assistance system 1 which provides, to the vehicle, integrated obstacle information obtained by integrating the detection results of the obstacle detected by the infrastructure sensor 200 and the onboard sensor 31, respectively, and performs vehicle assistance, it is possible to determine the presence or absence of the abnormality in these sensors during system operation.

(3) The onboard sensor 31 is mounted on each of a plurality of vehicles. The abnormality determination unit 203 compares the first obstacle information by the infrastructure sensor 200 with the second obstacle information by the onboard sensors 31 mounted on each of at least one or more infrastructure cooperative vehicles selected from among a plurality of vehicles (steps S206 and S208). Thus, it is possible to accurately determine the presence or absence of an abnormality in these sensors by comparing the respective detection results obtained by detecting the same obstacle with the infrastructure sensor 200 and each onboard sensor 31.

(4) If pieces of the second obstacle information by the respective onboard sensors 31 mounted on a plurality of infrastructure cooperative vehicles do not match each other (step S207: No), the abnormality determination unit 203 determines that the onboard sensor 31 that has output the second obstacle information different from the first obstacle information is abnormal. In addition, if pieces of the second obstacle information by the respective onboard sensors 31 match each other (step S207: Yes), and if the first obstacle information and the second obstacle information do not match (step S208: No), it is determined that the infrastructure sensor 200 is abnormal. Thus, when an abnormality occurs in the sensor unit 201 or the onboard sensor 31, it can be detected reliably.

(5) The infrastructure sensor 200 further includes a warning notification unit 204 that transmits the determination result by the abnormality determination unit 203 to the server 100 installed at a place different from the place of the infrastructure sensor 200. Thus, it is possible to reliably notify the system administrator who operates the server 100 to manage the vehicle assistance system 1 of the presence or absence of sensor abnormality.

(6) The vehicle assistance system 1 includes an infrastructure sensor 200 installed in a predetermined place to detect an obstacle, an onboard apparatus 300 connected to an onboard sensor 31 which is mounted on the vehicle and which detects an obstacle, and a server 100 installed in a place different from that of the infrastructure sensor 200. The infrastructure sensor 200 includes: a sensor unit 201 that detects an obstacle; an infrastructure-side obstacle notification unit 202 that notifies the onboard apparatus 300 of the obstacle detection result by the sensor unit 201; an abnormality determination unit 203 which compares the detection result of the obstacle by the sensor unit 201 with the detection result of the obstacle by the onboard sensor 31 notified from the onboard apparatus 300 and which, based on the result of the comparison, determines whether or not the sensor unit 201 or the onboard sensor 31 is abnormal; and a warning notification unit 204 that notifies the server 100 of a warning based on the determination result by the abnormality determination unit 203. The onboard apparatus 300 includes: a vehicle-side obstacle notification unit 305 that notifies the infrastructure sensor 200 of the detection result of the obstacle by the onboard sensor 31; a sensor fusion unit 304 that recognizes the obstacle based on the detection result of the obstacle by the sensor unit 201 notified from the infrastructure sensor 200, and the detection result of the obstacle by the onboard sensor 31; and a vehicle location notification unit 302 that notifies the server 100 of the vehicle location. The server 100 includes: an infrastructure cooperative vehicle selection unit 104 that selects at least one or more infrastructure cooperative vehicles from among a plurality of vehicles based on the location of the vehicle notified from the onboard apparatus 300, and the predetermined travel plan of a vehicle; and an infrastructure cooperative vehicle notification unit 105 that notifies the infrastructure sensor 200 of the infrastructure cooperative vehicle selected by the infrastructure cooperative vehicle selection unit 104. The abnormality determination unit 203 compares the detection result of the obstacle by the sensor unit 201 with the detection result of the obstacle by the onboard sensor 31 mounted on the infrastructure cooperative vehicle notified by the infrastructure cooperative vehicle notification unit 105. Thus, it is possible to achieve a vehicle assistance system 1 which provides, to the vehicle, integrated obstacle information obtained by integrating the detection results of the obstacle detected by the infrastructure sensor 200 and the onboard sensor 31, respectively, and performs vehicle assistance, and which can determine the presence or absence of the sensor abnormality in these sensors during system operation.

Second Embodiment

Figure 4:
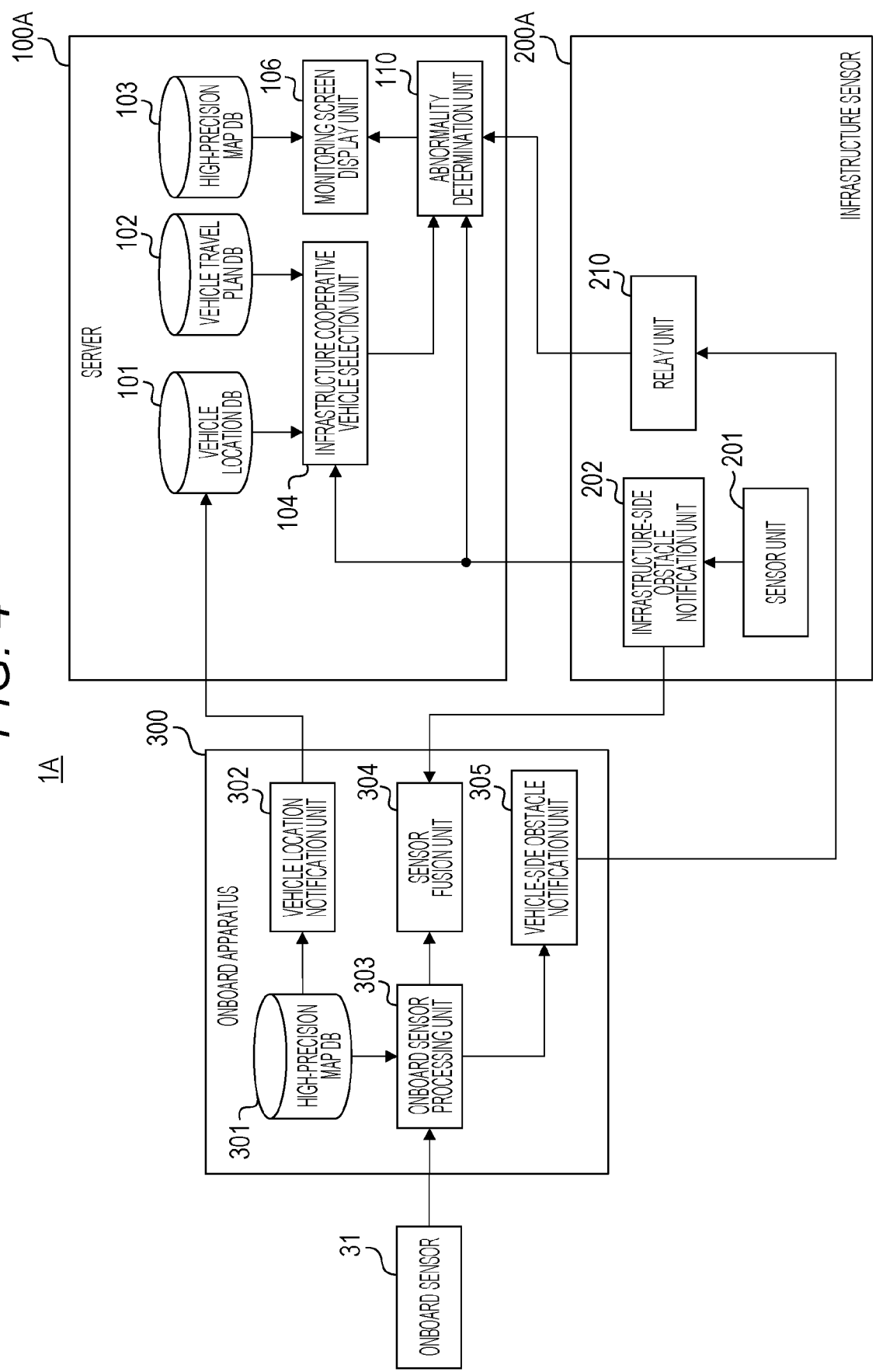
FIG. 4 is a diagram showing a configuration of a vehicle assistance system according to a second embodiment of the present invention.

FIG. 4 is a diagram showing a configuration of a vehicle assistance system according to a second embodiment of the present invention. The vehicle assistance system 1A shown in FIG. 4 includes a server 100A, an infrastructure sensor 200A, and an onboard apparatus 300; and performs assistance when the vehicle travels in a self driving or a manual driving on a vehicle on which the onboard apparatus 300 is mounted similarly to the vehicle assistance system 1 described in the first embodiment. The vehicle assistance system 1A of the present embodiment differs from the vehicle assistance system 1 of the first embodiment in that an abnormality determination for determining whether an abnormality has occurred in the sensor unit 201 or the onboard sensor 31 is performed on the server 100A side instead of the infrastructure sensor 200A side. Hereinafter, the vehicle assistance system 1A of the present embodiment will be described focusing mainly on this difference.

The server 100A does not include the infrastructure cooperative vehicle notification unit 105 in FIG. 1, but includes an abnormality determination unit 110 for performing abnormality determination on the server 100A side. The abnormality determination unit 110 has the same function as the abnormality determination unit 203 in FIG. 1 included in the infrastructure sensor 200 in the first embodiment.

The infrastructure sensor 200A does not include the abnormality determination unit 203 and the warning notification unit 204 in FIG. 1, but includes a relay unit 210. The relay unit 210 has a function of relaying the second obstacle information transmitted from the onboard apparatus 300 to the infrastructure sensor 200A and transmitting the second obstacle information to the server 100A via the infrastructure sensor 200A.

Figure 5:
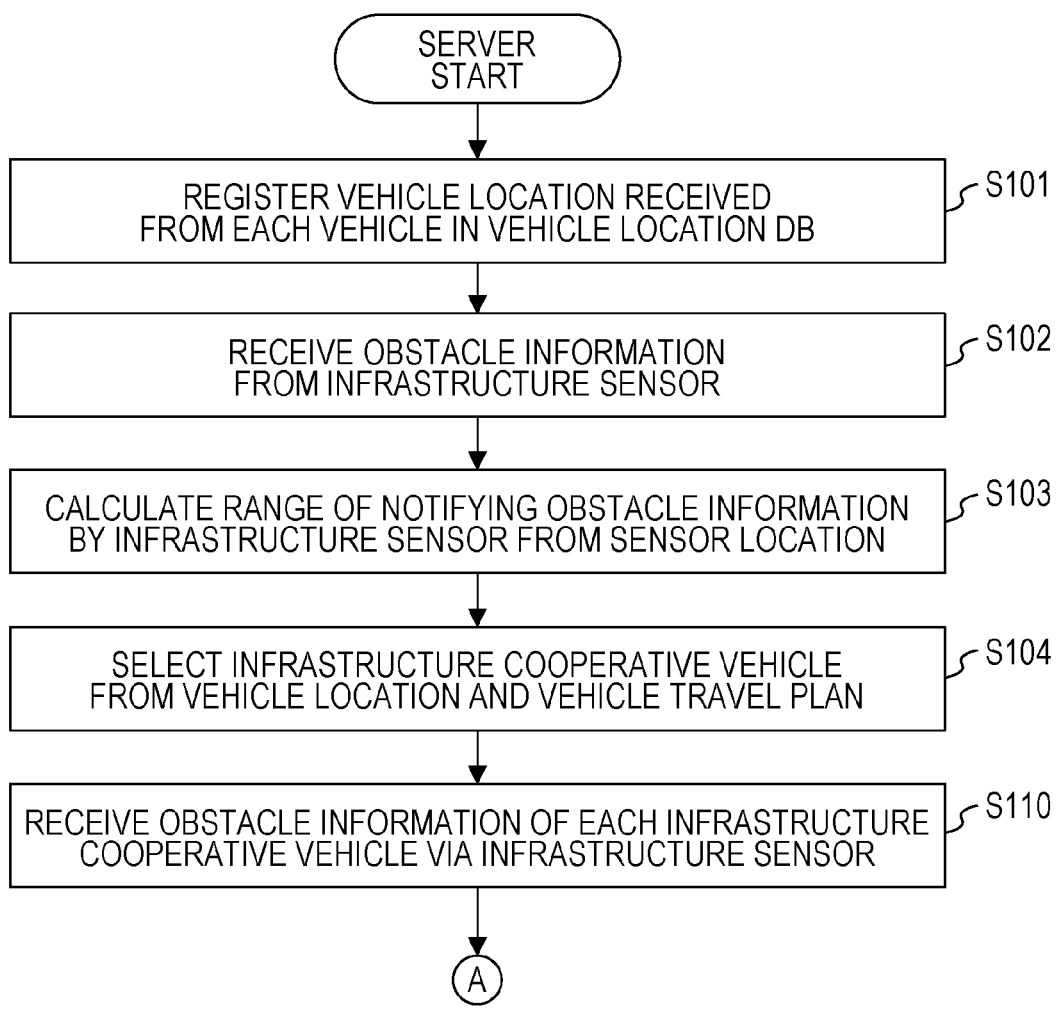
FIG. 5 is a diagram showing a processing flow of a sensor abnormality determination executed by a server in the vehicle assistance system according to the second embodiment of the present invention.
Figure 6:
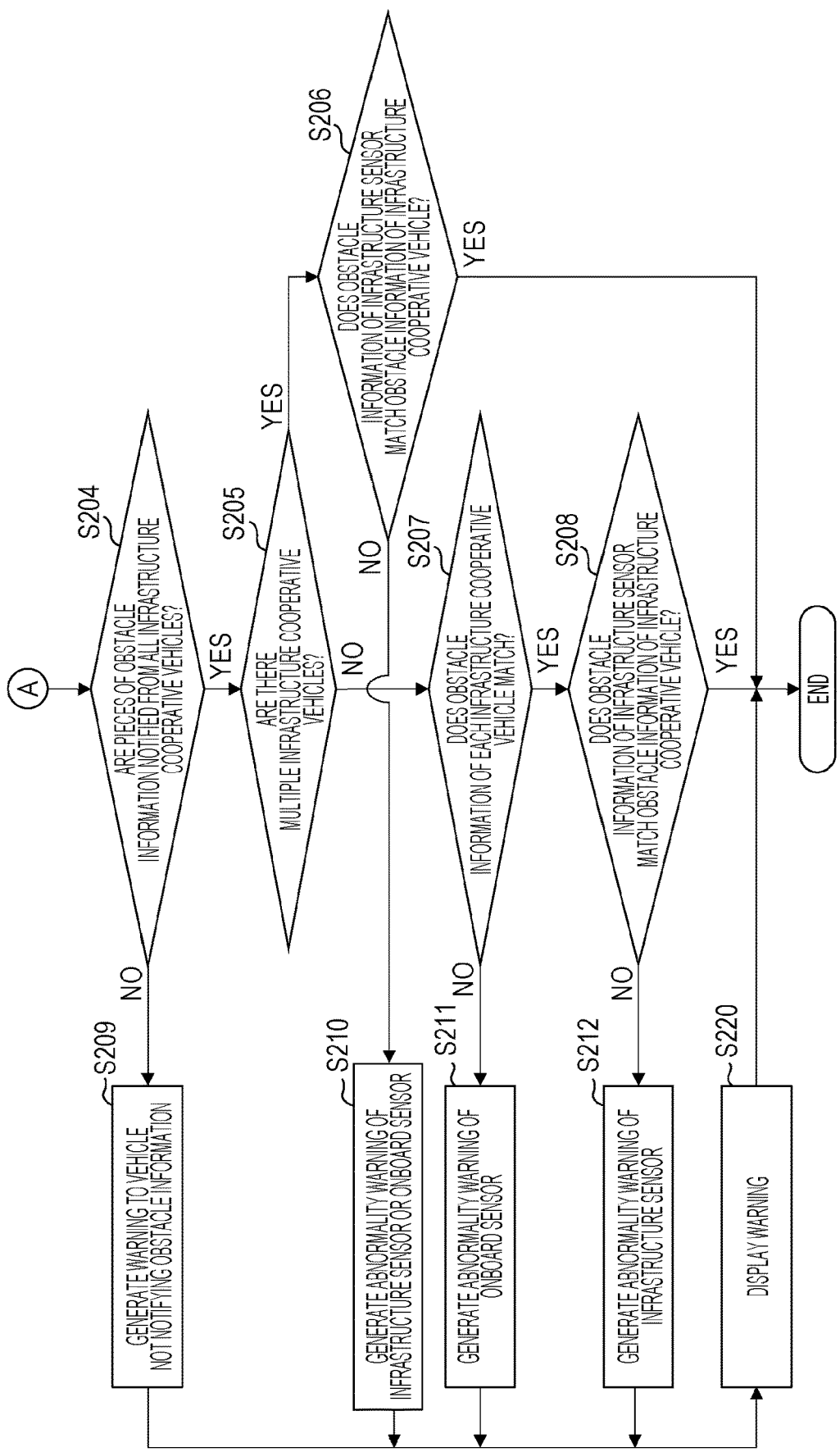
FIG. 6 is a diagram showing a processing flow of a sensor abnormality determination executed by a server in the vehicle assistance system according to the second embodiment of the present invention.

Next, the sensor abnormality determination performed by the vehicle assistance system 1A according to the present embodiment will be described with reference to FIGS. 5 and 6. FIGS. 5 and 6 are diagrams showing a processing flow of sensor abnormality determination executed by the server 100A in the vehicle assistance system 1A according to the second embodiment of the present invention.

In steps S101 to S104, the server 100A performs the same processing as the processing flow in FIG. 2 described in the first embodiment. In step S110 performed after step S104, the server 100A receives, via the infrastructure sensor 200A, the obstacle information of each infrastructure cooperative vehicle relayed by the relay unit 210, that is, the second obstacle information transmitted from the onboard apparatus 300 mounted on each infrastructure cooperative vehicle. It should be noted that the second obstacle information to be received in step S110 may include the second obstacle information transmitted from a vehicle other than the infrastructure cooperative vehicle. When the processing in step S110 is performed, the process proceeds to step S204 in FIG. 6.

In steps S204 to S212, using the first obstacle information received from the infrastructure sensor 200A in step S102 and pieces of the second obstacle information received, via the infrastructure sensor 200A, from the onboard apparatuses 300 of the respective infrastructure cooperative vehicles in step S110, the server 100A causes the abnormality determination unit 110 to perform the same processing as in the processing flow in FIG. 3 described in the first embodiment. At this time, the determination in steps S204 to S208 is performed on the infrastructure cooperative vehicle selected in step S104. Thus, similarly to the first embodiment, the presence or absence of the abnormality occurrence in any one of the sensor unit 201 of the infrastructure sensor 200A and the onboard sensor 31 mounted on the infrastructure cooperative vehicle is determined, and a warning corresponding to the determination result is generated.

In step S220 performed after step S212, the server 100A causes the monitoring screen display unit 106 to perform a warning display targeting the sensor in which abnormality has occurred, based on the warning generated in any one of steps S209 to S212. Thus, when an abnormality occurs in the infrastructure sensor 200A or the onboard sensor 31 during the operation of the vehicle assistance system 1A, the system administrator is notified to that effect.

After executing step S220, the infrastructure sensor 200A ends the processing shown in the flowchart in FIG. 6.

According to the second embodiment of the present invention described above, in addition to (1) to (4) described in the first embodiment, the following action and effect are further produced.

(7) The abnormality determination unit 110 compares the first obstacle information received by the server 100A from the infrastructure sensor 200A with the second obstacle information received by the server 100A from the vehicle via the infrastructure sensor 200A. Thus, in the server 100A, it is possible to determine the presence or absence of an abnormality in these sensors by comparing the respective detection results obtained by detecting the same obstacle with the infrastructure sensor 200A and each onboard sensor 31.

(8) The vehicle assistance system 1A includes an infrastructure sensor 200A installed in a predetermined place to detect an obstacle, an onboard apparatus 300 connected to an onboard sensor 31 which is mounted on the vehicle and which detects an obstacle, and a server 100A installed in a place different from that of the infrastructure sensor 200A. The infrastructure sensor 200A includes: a sensor unit 201 that detects an obstacle; an infrastructure-side obstacle notification unit 202 that notifies the onboard apparatus 300 and the server 100A of the detection result of the obstacle by the sensor unit 201; and a relay unit 210 that notifies the server 100A of the detection result of the obstacle detected by the onboard sensor 31 notified from the onboard apparatus 300. The onboard apparatus 300 includes: a vehicle-side obstacle notification unit 305 that notifies the infrastructure sensor 200A of the detection result of the obstacle by the onboard sensor 31; a sensor fusion unit 304 that recognizes the obstacle based on the detection result of the obstacle by the sensor unit 201 notified from the infrastructure sensor 200A, and the detection result of the obstacle by the onboard sensor 31; and a vehicle location notification unit 302 that notifies the server 100A of the vehicle location. The server 100A includes: an infrastructure cooperative vehicle selection unit 104 that selects at least one or more infrastructure cooperative vehicles from among a plurality of vehicles based on the location of the vehicle notified from the onboard apparatus 300, and the predetermined travel plan of a vehicle; and an abnormality determination unit 110 which compares the detection result of the obstacle by the sensor unit 201 notified from the infrastructure sensor 200A with the detection results of the obstacle by the onboard sensors 31 mounted on the infrastructure cooperative vehicles among the plurality of vehicles, and which determines whether or not the sensor unit 201 or the onboard sensor 31 is abnormal based on the result of this comparison. Thus, it is possible to achieve a vehicle assistance system 1A which provides, to the vehicle, integrated obstacle information obtained by integrating the detection results of the obstacle detected by the infrastructure sensor 200A and the onboard sensor 31, respectively, and performs vehicle assistance, and which can determine the presence or absence of the sensor abnormality in these sensors during system operation.

Third Embodiment

Figure 7:
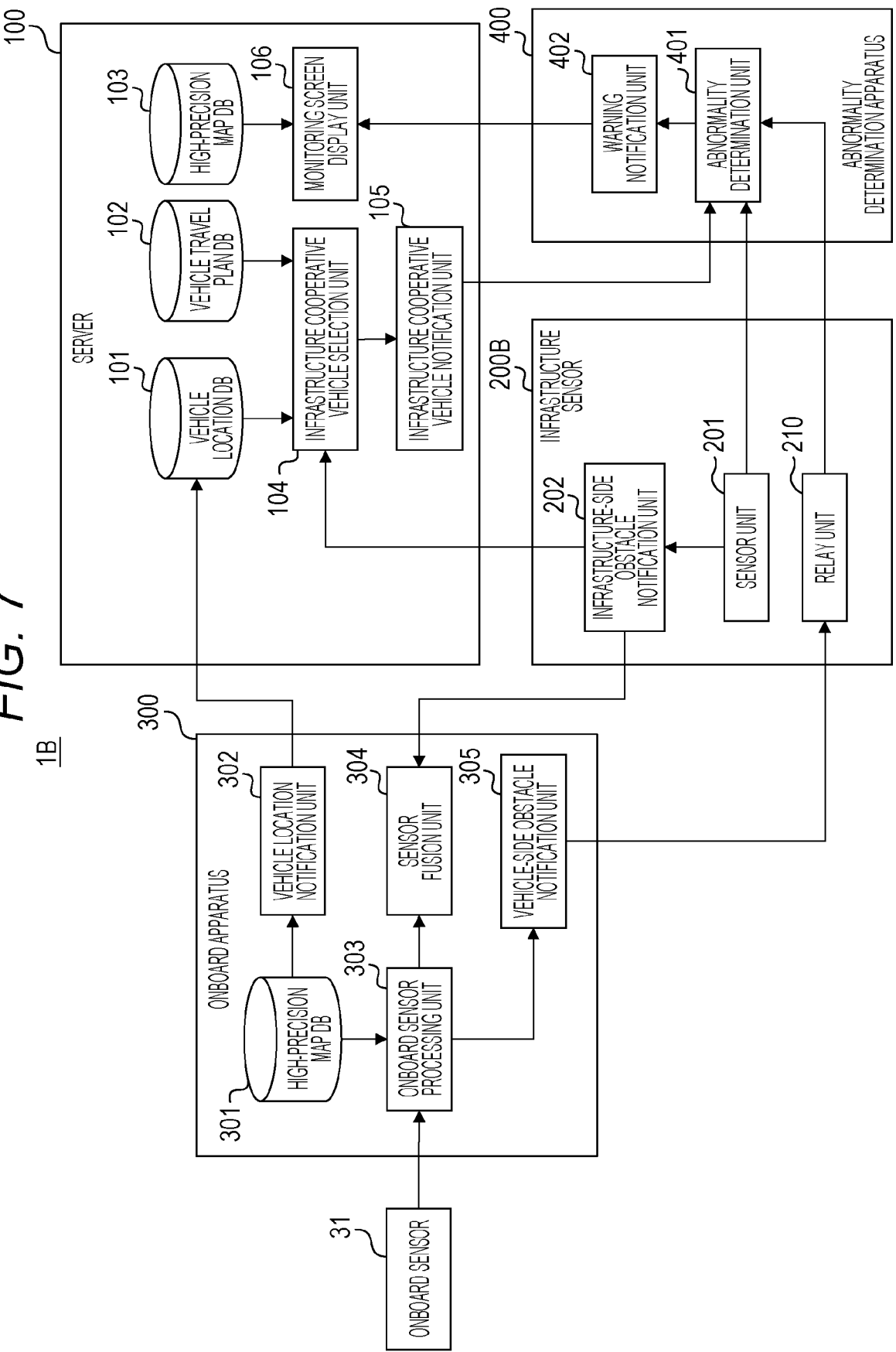
FIG. 7 is a diagram showing a configuration of a vehicle assistance system according to a third embodiment of the present invention.

FIG. 7 is a diagram showing a configuration of a vehicle assistance system according to a third embodiment of the present invention. The vehicle assistance system 1B shown in FIG. 7 includes a server 100, an infrastructure sensor 200B, an onboard apparatus 300, and an abnormality determination apparatus 400; and performs assistance when the vehicle travels in a self driving or a manual driving on a vehicle on which the onboard apparatus 300 is mounted similarly to the vehicle assistance system 1 described in the first embodiment. The vehicle assistance system 1B of the present embodiment differs from the vehicle assistance systems 1 and 1A of the first and second embodiments in that an abnormality determination for determining whether an abnormality has occurred in the sensor unit 201 or the onboard sensor 31 is performed in the abnormality determination apparatus 400 provided separately from the infrastructure sensor 200B and the server 100. Hereinafter, the vehicle assistance system 1B of the present embodiment will be described focusing mainly on this difference.

The infrastructure sensor 200B includes a sensor unit 201, an infrastructure-side obstacle notification unit 202, and a relay unit 210, similarly to the infrastructure sensor 200A described in the second embodiment. In the present embodiment, the relay unit 210 of the infrastructure sensor 200B has a function of relaying the second obstacle information transmitted from the onboard apparatus 300 to the infrastructure sensor 200B and transmitting the second obstacle information to the abnormality determination apparatus 400 via the infrastructure sensor 200B.

The abnormality determination apparatus 400 receives the first obstacle information and the second obstacle information from the infrastructure sensor 200B, and also receives the notification of the infrastructure cooperative vehicle from the server 100. The abnormality determination apparatus 400 includes an abnormality determination unit 401 and a warning notification unit 402.

Similarly to the abnormality determination unit 203 in FIG. 1 and the abnormality determination unit 110 in FIG. 4, the abnormality determination unit 401 compares the first obstacle information by the sensor unit 201 received from the infrastructure sensor 200B and the second obstacle information by the onboard sensor 31 received from the onboard apparatus 300 via the infrastructure sensor 200B, and performs, based on the comparison result, abnormality determination of determining whether or not an abnormality has occurred in the sensor unit 201 or the onboard sensor 31. If it is determined that an abnormality occurs in the sensor unit 201 or the onboard sensor 31, the abnormality determination unit 401 generates a warning according to the determination result and outputs the warning to the warning notification unit 402.

Similarly to the warning notification unit 204 in FIG. 1 described in the first embodiment, when the abnormality determination unit 401 generates a warning, the warning notification unit 402 transmits the warning information to the server 100, thereby notifying the warning. The warning notification unit 402 can communicate with the server 100 using, for example, a fixed line or a mobile communication network (4G, 5G).

It should be noted that the abnormality determination apparatus 400 may be connected to the infrastructure sensor 200B or the server 100. When connected to the server 100, the abnormality determination unit 401 can receive the first obstacle information transmitted from the infrastructure-side obstacle notification unit 202 of the infrastructure sensor 200B via the server 100. Alternatively, the abnormality determination apparatus 400 may be built in to the infrastructure sensor 200B or the server 100. When the abnormality determination apparatus 400 is built in to the infrastructure sensor 200B, the relay unit 210 is unnecessary in the infrastructure sensor 200B. Therefore, the infrastructure sensor 200B has the same configuration as the infrastructure sensor 200 in FIG. 1. On the other hand, when the abnormality determination apparatus 400 is built in to the server 100, the infrastructure cooperative vehicle notification unit 105 is unnecessary in the server 100, and the warning notification unit 402 is unnecessary in the abnormality determination apparatus 400. Therefore, the server 100 has the same configuration as the server 100A in FIG. 4.

According to the third embodiment of the present invention described above, the same action and effect as those described in the first and second embodiments are produced.

The embodiments and various modifications described above are merely examples, and the present invention is not limited to these contents unless the characteristics of the invention are impaired. In addition, although various embodiments and modifications have been described above, the present invention is not limited to these contents. Other aspects conceivable within the scope of the technical idea of the present invention are also included in the scope of the present invention.

What is claimed is:

1. A method executed by an abnormality determination apparatus of a vehicle assistance system, the method comprising:
receiving a first indication of an obstacle from an infrastructure sensor that is installed in a predetermined place,
receiving a second indication of the obstacle from an onboard sensor mounted on a vehicle that is selected from among a plurality of vehicles in the vehicle assistance system based on a location of the vehicle and a predetermined travel plan of the vehicle, wherein the second indication is received in response to a request from the infrastructure sensor;
performing a comparison of the first indication of the obstacle with the second indication of the obstacle;
determining whether or not the infrastructure sensor or the onboard sensor is abnormal based on the comparison;
sending a notification to a server when the infrastructure sensor or the onboard sensor is determined to be abnormal.

2. The method according to claim 1, further including:
receiving an additional indication of the obstacle from a respective onboard sensor of a second vehicle,
wherein the determining is further based on the additional indication.

3. The method according to claim 1, wherein
the server is installed in a place different from the infrastructure sensor.

4. A vehicle assistance system comprising:
an infrastructure sensor installed in a predetermined place, the infrastructure sensor configured to detect an obstacle;
an onboard apparatus connected to an onboard sensor mounted on a vehicle, the onboard sensor configured to detect the obstacle; and
a server installed in a place different from the infrastructure sensor,
wherein the infrastructure sensor includes:
a sensor unit configured to detect the obstacle;
an infrastructure-side obstacle notification unit configured to notify the onboard apparatus of a first detection result of the obstacle by the sensor unit;
an abnormality determination unit configured to perform a comparison of the first detection result of the obstacle by the sensor unit with a second detection result of the obstacle by the onboard sensor notified from the onboard apparatus, the abnormality determination unit configured to determine whether or not the sensor unit or the onboard sensor is abnormal based on a result of the comparison; and
a warning notification unit configured to notify the server of a warning based on a determination result by the abnormality determination unit,
the onboard apparatus includes:
a vehicle-side obstacle notification unit configured to notify the infrastructure sensor of the second detection result;
a sensor fusion unit configured to recognize the obstacle based on the first detection result and the second detection result; and
a vehicle location notification unit configured to notify the server of a location of the vehicle,
the server includes:
an infrastructure cooperative vehicle selection unit configured to select the vehicle from among a plurality of vehicles based on the location of the vehicle notified from the onboard apparatus and a predetermined travel plan of the vehicle; and
an infrastructure cooperative vehicle notification unit configured to notify the infrastructure sensor of the vehicle selected by the infrastructure cooperative vehicle selection unit, and
the abnormality determination unit compares the second detection result with the first detection result.

5. A vehicle assistance system comprising:
an infrastructure sensor installed in a predetermined place, the infrastructure sensor configured to detect an obstacle;
an onboard apparatus connected to an onboard sensor mounted on a vehicle, the onboard sensor configured to detect the obstacle; and
a server installed in a place different from the infrastructure sensor,
wherein the infrastructure sensor includes:
a sensor unit configured to detect the obstacle;
an infrastructure-side obstacle notification unit configured to notify the onboard apparatus and the server of a first detection result of the obstacle by the sensor unit; and
a relay unit configured to notify the server of the first detection result from the onboard apparatus,
the onboard apparatus includes:
a vehicle-side obstacle notification unit configured to notify the infrastructure sensor of a second detection result of the obstacle by the onboard sensor;
a sensor fusion unit configured to recognize the obstacle based on the first detection result and the second detection result; and
a vehicle location notification unit configured to notify the server of a location of the vehicle, and
the server includes:
an infrastructure cooperative vehicle selection unit configured to select the vehicle from among a plurality of vehicles based on the location of the vehicle notified from the onboard apparatus and a predetermined travel plan of the vehicle; and
an abnormality determination unit configured to perform a comparison of the first detection result with the second detection result, and determine whether or not the sensor unit or the onboard sensor is abnormal based on a result of the comparison.

* * * * *